(12) United States Patent
Taylor

(10) Patent No.: US 8,752,508 B2
(45) Date of Patent: Jun. 17, 2014

(54) PET PUZZLE GAME UTILIZING TENNIS BALLS

(75) Inventor: Dale Taylor, Centennial, CO (US)

(73) Assignee: The Kyjen Company, Inc., Centennial, CO (US)

( * ) Notice: Subject to any disclaimer, the term of this patent is extended or adjusted under 35 U.S.C. 154(b) by 346 days.

(21) Appl. No.: 13/136,765

(22) Filed: Aug. 10, 2011

(65) Prior Publication Data

US 2013/0036987 A1 Feb. 14, 2013

(51) Int. Cl.
*A01K 15/02* (2006.01)
*A01K 29/00* (2006.01)

(52) U.S. Cl.
CPC ................................... *A01K 15/025* (2013.01)
USPC .......................................... 119/707; 119/702

(58) Field of Classification Search
CPC ...... A01K 15/02; A01K 15/025; A01K 29/00
USPC .................................. 119/702, 707, 709, 710
See application file for complete search history.

(56) References Cited

U.S. PATENT DOCUMENTS

| 6,032,615 | A | * | 3/2000 | Girard | 119/707 |
| 2009/0277396 | A1 | * | 11/2009 | Shatoff et al. | 119/707 |
| 2010/0107990 | A1 | * | 5/2010 | Plante | 119/707 |
| 2010/0258060 | A1 | * | 10/2010 | Wilson et al. | 119/707 |

\* cited by examiner

*Primary Examiner* — Monica Williams

(57) ABSTRACT

The invention relates to a molded pet toy puzzle with a top aperture to receive a ball and wherein gravity will force the ball randomly into one of three tunnels with a terminus at each end. Each terminus will have some type of covering wherein an animal must determine how to open the covering to retrieve the ball.

1 Claim, 4 Drawing Sheets

PET PUZZLE GAME UTILIZING TENNIS BALLS

FIELD

The invention relates to a novel pet toy wherein the toy is a molded receptacle in the shape of, in this instance, a tree trunk. A ball is dropped into a top aperture and randomly ejects into an exit receptacle. The animal must figure out which exit receptacle the ball exited in and how to retrieve it.

BACKGROUND OF THE INVENTION

The invention most closely corresponds with USPTO Class 119/702 wherein Class 119 relates to animal husbandry and sub-class 702 includes exercise or amusement devices for animals.

In its simplest form, the invention comprises a novel molded puzzle toy shaped, in this example, in the form of a tree trunk. The top of the puzzle toy has an aperture wherein a ball is dropped and will randomly exit into a tunnel and ultimately a terminus receptacle in the bottom of the toy. The animal has to determine which terminus the ball exited into; solve an impediment, and retrieve the ball.

There are obviously many pet toys on the market. The inventive toy accomplishes exercise and amusement for the animal as well as a learning system that challenges the animal's powers of choice and memory. Further, the inventive toy provides a "reward" when the animal is able to retrieve the ball. It is the Inventor's goal to not only amuse the animal, but to teach it.

THE INVENTION

Summary, Objects and Advantages

The inventive toy may be shaped in any moldable form. The embodiment disclosed is a tree trunk shape, but there could be many shapes the toy can be manufactured in and still attain the same purpose.

A ball is dropped into the top receptacle, and gravity will randomly force the ball into one of the exit "tunnels". At the terminus of any given tunnel, there may be impediments for the animal to overcome to retrieve the ball. The animal must use its puzzle solving abilities to solve each one in a different manner.

One terminus impediment embodiment is a door that rotates in the plane of the tunnel opening on a pin affixed to the top of the tunnel. Another is a bar that raises and lowers blocking the exit of the tunnel, much like a gate. The third is hinged at the top similar to a garage door that fully conceals the ball and must be lifted up.

Once the animal determines which terminus the ball is in, it solves the impediment, retrieves the ball, and is rewarded by that action.

In summary, the inventive toy exhibits advantages and novelty over the art in that the design and functionality make this pet toy safe, stimulating, durable, and reusable.

BRIEF DESCRIPTION OF THE DRAWINGS

The invention is described in further detail by reference to the drawings in which.

DETAILED DESCRIPTION, INCLUDING BEST MODES OF CARRYING OUT THE INVENTION

The following detailed description illustrates the invention by way of example, not by way of limitation of the principles of the invention. This description will clearly enable one skilled in the art to make and use the invention, and describes various embodiments, adaptations, variations, alternatives, and uses of the invention. The description includes what are presently believed to be the best modes of carrying out the invention.

In this regard, the invention is illustrated in four relatively simple figures; although sufficiently complex as to illuminate to one skilled in the art of such manufacturing and design, a viable method for making or using said invention.

Figure 1:
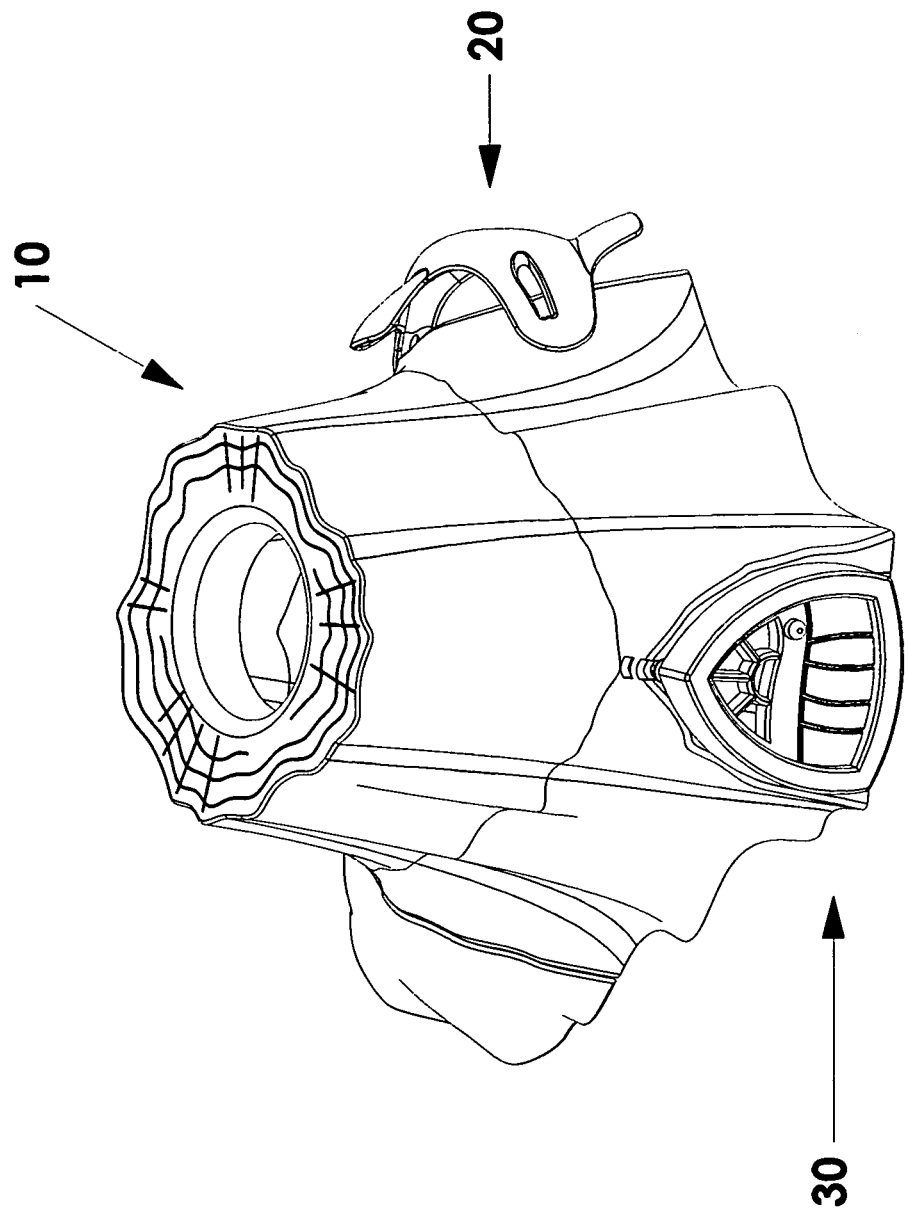
FIG. 1; is an external view of the tree trunk shape showing terminus options.

FIG. 1 is an external view of the toy as shaped into the aforementioned tree trunk mold 10. One terminus puzzle door is shown as having a latched curvature flap 20 which the animal must determine how to unclasp to retrieve the ball. A second terminus example is a door 30 wherein the animal must determine how to open the door to retrieve the tennis ball.

Figure 2:
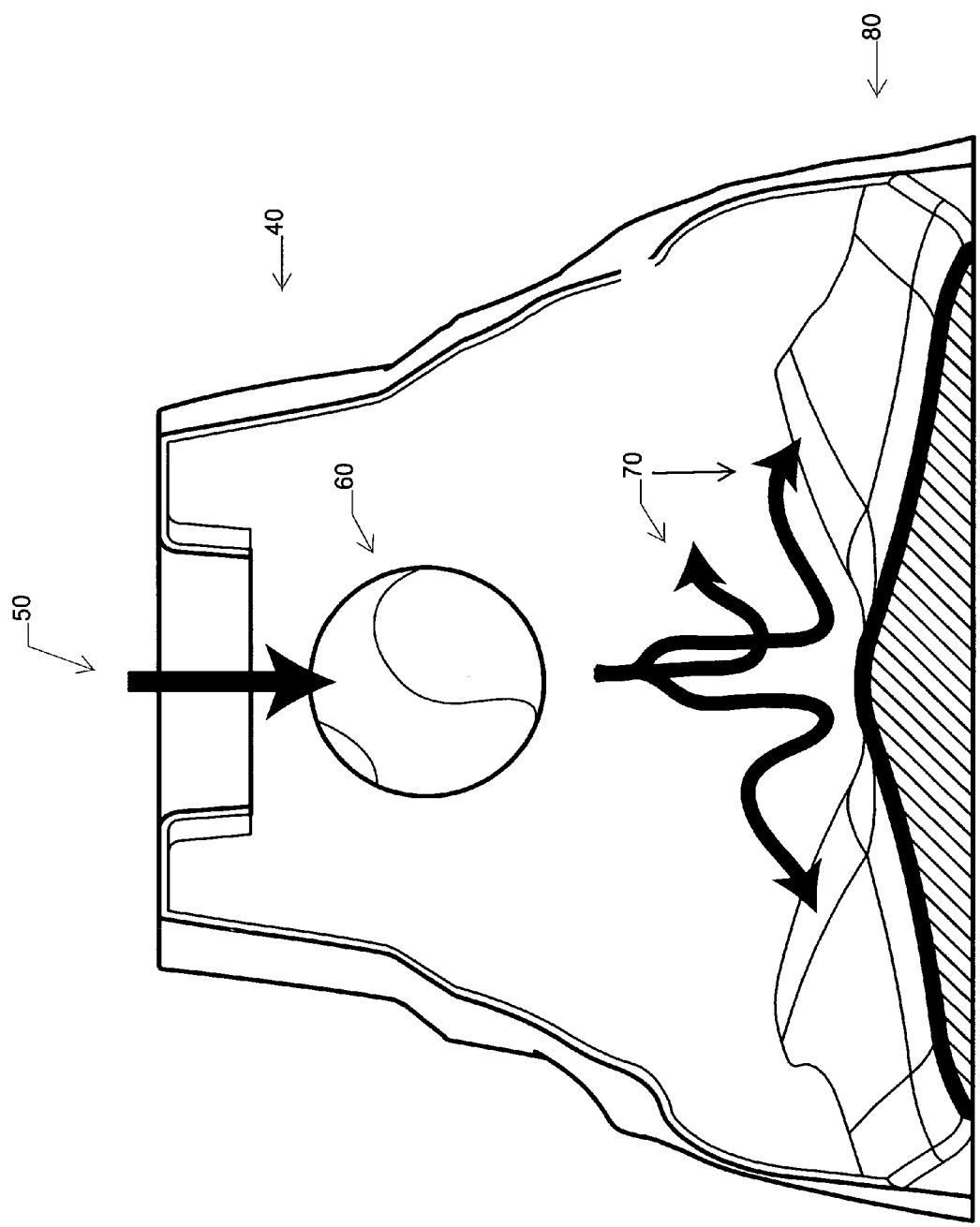
FIG. 2; is an internal view sans tunnel walls illustrating general travel of ball.

FIG. 2 is an internal view of the toy 40 sans tunnel walls so as to clearly illustrate the ball insertion 50 and ball succumbing to gravity 60 to randomly exit one of the tunnels 70 to a terminus 80. This is a fairly simple random gravitational process wherein the tunnel resulted is random based upon various physics of ball insertion.

Figure 3:
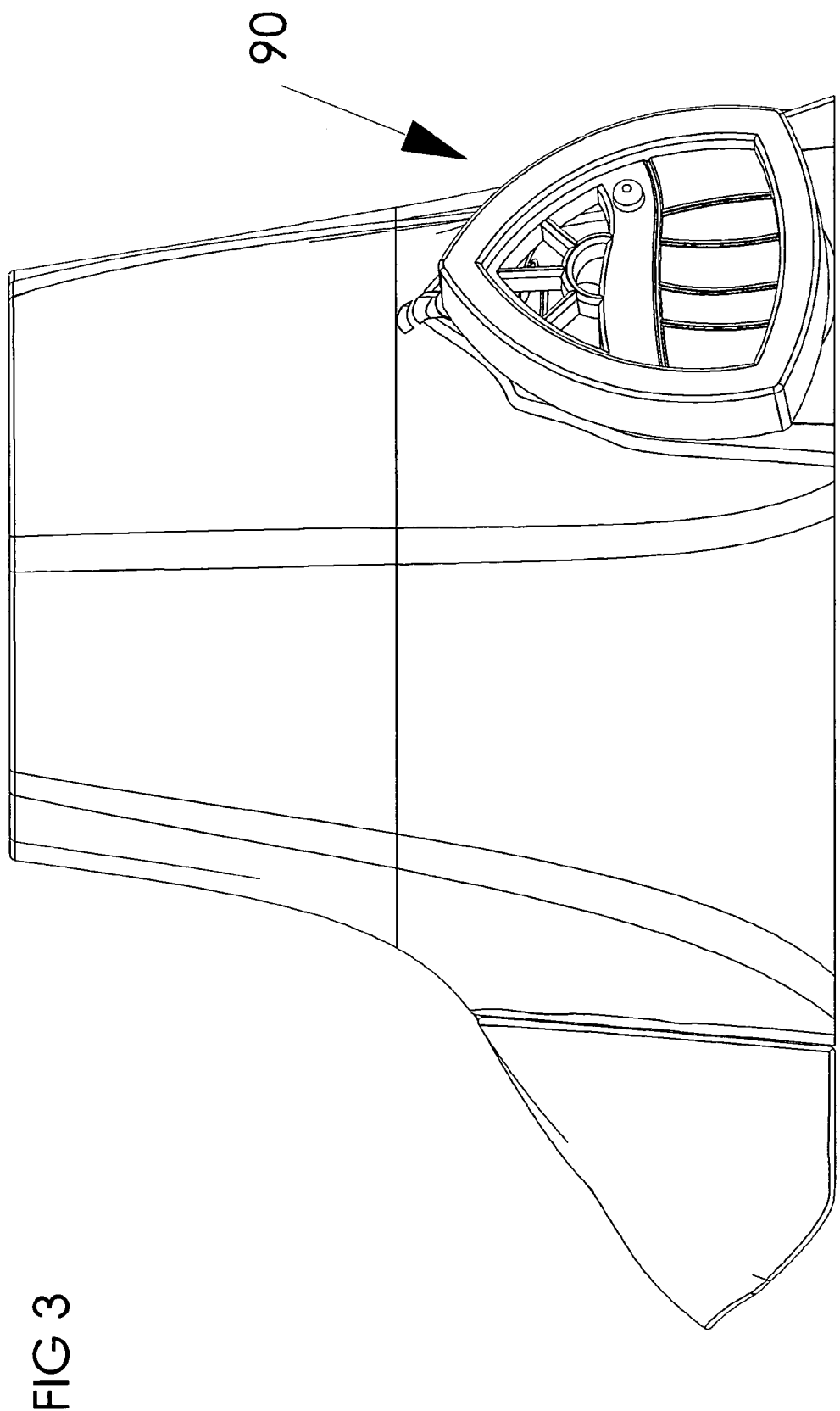
FIG. 3; is a magnified view of one of the terminus puzzle doors.

FIG. 3 is a magnified view of a terminus example 90, herein the door which an animal must determine how to open to retrieve the ball. Obviously the user then closes the door for reactivation.

Figure 4:
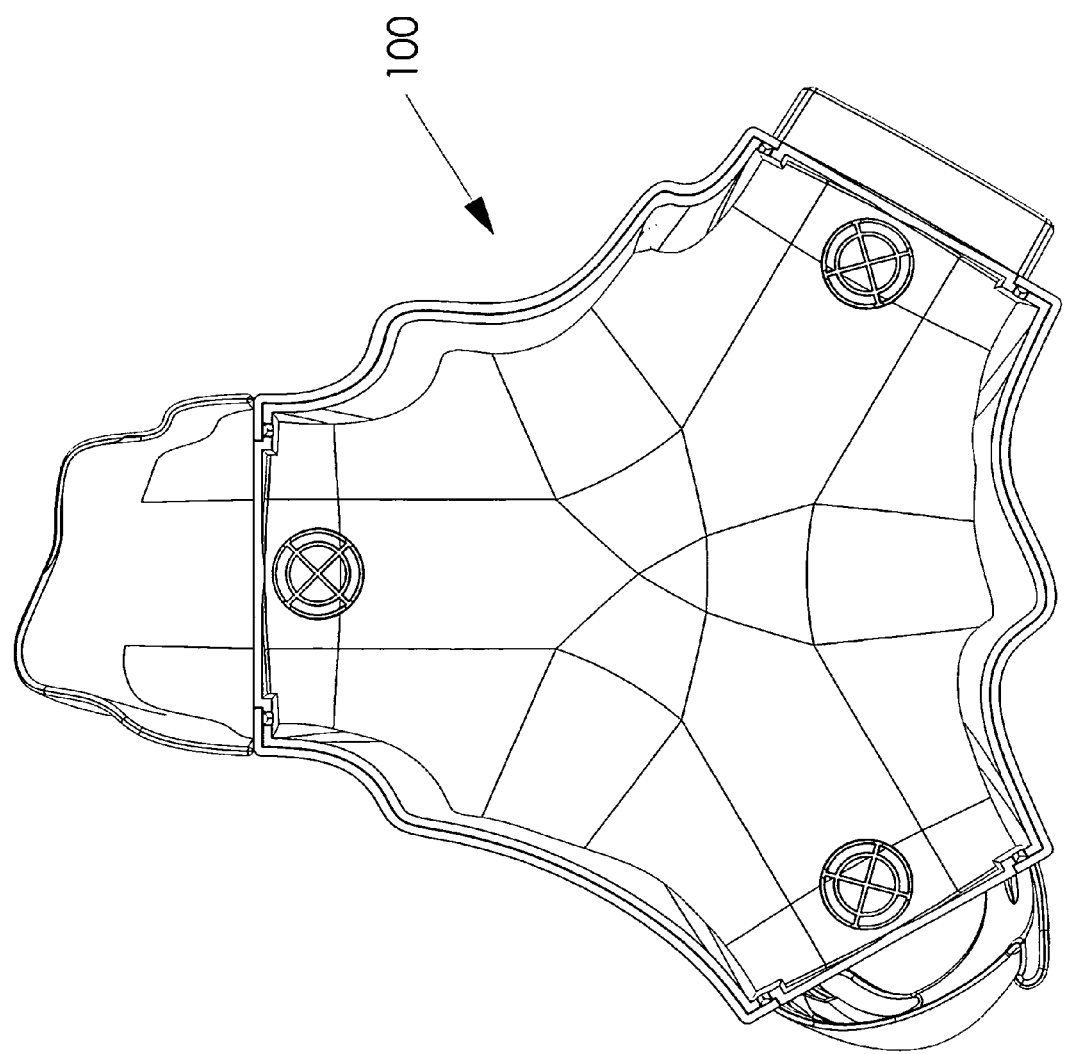
FIG. 4 is a bottom view of the tree trunk as molded and sealed.

FIG. 4 is a bottom view of the toy shown as molded and sealed 100 so that the balls do not fall out the bottom of the toy but are rather directed to a tunnel and terminus.

The invention claimed is:
1. A molded pet toy comprising:
a molded plastic housing in the shape of a faux tree trunk having a top aperture adapted to receive a ball;
said top aperture connected to several tunnels inside said housing, each of said tunnels ending in a terminus;
each terminus is covered with a latched closure on the exterior of the housing;
wherein when a ball is dropped into the top aperture the ball will enter into one of the several tunnels dependent upon the angle of drop of the ball, the ball will then fall to the terminus of the corresponding tunnel through the force of gravity, and wherein the terminus covering must be unlatched from the exterior of the housing to retrieve the ball.

* * * * *